Figure 1:
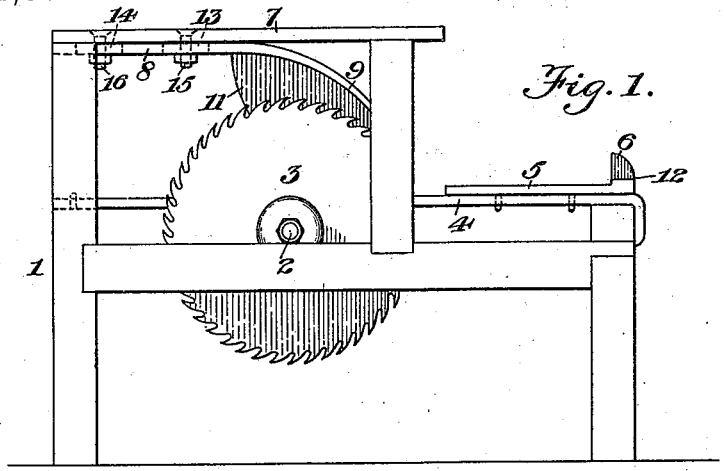

(No Model.)

L. C. RINGUETTE.
SAW GUARD.

No. 551,002. Patented Dec. 10, 1895.

Witnesses
C. W. Smith
R. M. Smith

Inventor
Louis C. Ringuette
By his Attorneys,
C. A. Snow & Co.

UNITED STATES PATENT OFFICE.

LOUIS COME RINGUETTE, OF RHINELANDER, WISCONSIN.

SAW-GUARD.

SPECIFICATION forming part of Letters Patent No. 551,002, dated December 10, 1895.

Application filed April 15, 1895. Serial No. 545,763. (No model.)

*To all whom it may concern:*

Be it known that I, LOUIS COME RINGUETTE, a citizen of the United States, residing at Rhinelander, in the county of Oneida and State of Wisconsin, have invented a new and useful Saw-Guard, of which the following is a specification.

This invention relates to an improvement in saw-guards, being designed especially for use in connection with machines for sawing up shingles into different grades and removing the portions thereof containing knots and other imperfections.

The object of the present invention is to provide a simple and inexpensive construction of saw-guard which is capable of being adjusted to a saw of any size, being designed to protect the operator from injury, while at the same time permitting the free operation of the saw.

A further object of the invention is to provide novel means whereby said saw-guard may be easily and readily moved away from the saw when necessary for the purpose of changing saws or adjusting the bearings thereof or for other purpose.

In order to accomplish the above objects, the invention consists in a saw-guard possessing certain novel features of construction and adjustability, as hereinafter fully described, illustrated in the drawings, and pointed out in the claims.

Figure 2:
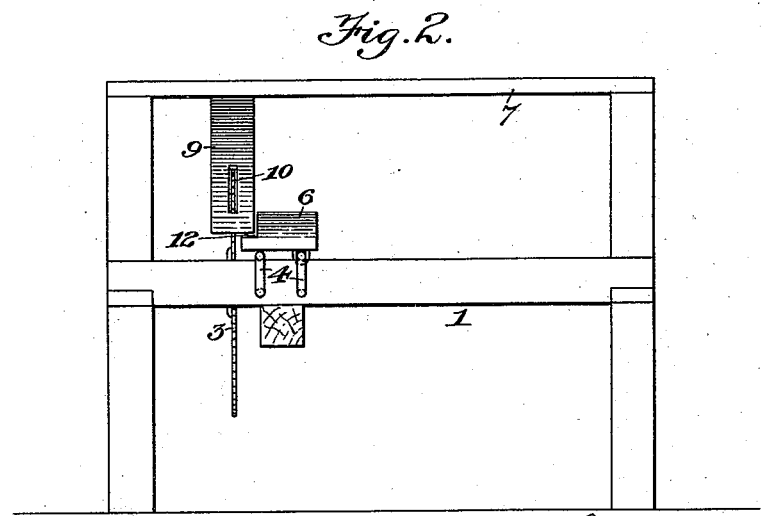
Figure 3:
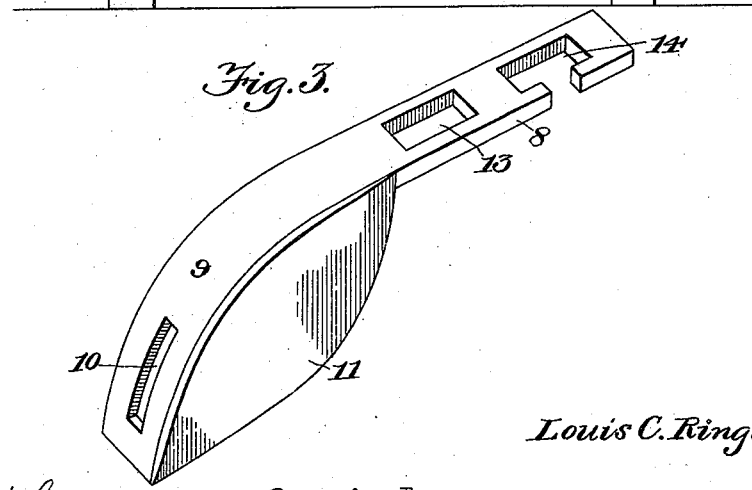

In the accompanying drawings, Figure 1 is a side elevation of a knot-sawing machine, illustrating the manner in which my improved saw-guard is attached thereto. Fig. 2 is a front elevation of the same. Fig. 3 is an enlarged detail perspective view showing the specific form of the improved saw-guard, showing the form of the slot by means of which said guard is adjustable to saws of different sizes and rendered capable of being thrown away from the saw when desired.

Similar numerals of reference designate corresponding parts in the several figures of the drawings.

Referring to the drawings, 1 indicates the frame of a knot-sawing machine as ordinarily constructed. The machine which is employed for the purpose of edging off shingles or for removing portions thereof containing knots or other imperfections is provided at suitable points, preferably in rear of the center of the machine-frame, with a transversely-arranged saw-arbor 2, upon one end of which is mounted a circular saw 3.

Arranged just above the saw-arbor and adjacent to the saw is a pair of parallel supporting rods or tracks 4, arranged in parallel relation to each other, extending longitudinally of the machine, and connected at their opposite ends to the front and rear transverse timbers or cross-bars of the machine-frame. 5 designates a sliding carriage mounted upon said rods or tracks and held in place by means of eyes or staples projecting from the under side thereof and surrounding one of the guiding rods or tracks, as indicated, said carriage also being provided at its advanced end with a flange 6, which serves to support the shingles as they are advanced toward the saw and also forms a handle by which the operator may grasp and manipulate the carriage. Located immediately above the saw is the usual receiving-table 7, the office of which is to receive the shingles as they fall from the shingle-machine preparatory to their being edged up. The receiving-table, located as just described, forms a convenient support for my improved saw-guard, which may be bolted to the under side thereof, as shown.

The improved saw-guard comprises a horizontally-extending flat bar 8, of steel or any other suitable metal, which at its front end is curved, as indicated at 9, to extend downwardly in front of the teeth of the saw and within a short distance of the path in which the carriage 5 travels. The curvature of the front portion 9 of the saw-guard conforms approximately to the diameter of the circular saw, and at or near the lower end said curved portion 9 is provided with an observation-slot 10, by means of which the position of the saw-guard may be correctly regulated. Upon one side the guard is provided with a vertical flange, which is substantially elliptical in form, arranged upon the same side of the saw as that upon which the carriage travels and extending downward and forward to the forward extremity of the curved portion of the guard. The guard 9, having the vertical flange 11 combined therewith, as described, serves to effectually prevent the fingers of the operator from coming in contact with the teeth of the saw. The distance between the lower edge of the guard and the upper face of the carriage 5 is about equal to the thickness of two shingles, or about three-quarters of an inch. In order to enable the carriage to travel a sufficient distance past the front edge of the guard to feed the shingles properly to the saw, the ridge or flange 6 at the front end of the carriage is notched or cut out, as indicated at 12.

The upper horizontal portion 8 of the guard is provided with two slots 13 and 14, the one 13 being in the form of an ordinary elongated slot extending longitudinally of the portion 8, thus providing for the longitudinal adjustment of the saw-guard. The other slot 14 is T-shaped and opens out at one side of said horizontal portion 8, the longitudinal portion of the slot being approximately the same length as the slot 13 and the angular or lateral portion of the slot enabling the saw-guard as a whole to be vibrated about the forward securing-bolt 15 as a center.

By means of the construction above described when it is desired to throw said guard away from the saw for any purpose whatever all that is necessary to be done is to loosen up the nuts on the bolts 15 and 16, which engage the slots 13 and 14, respectively, when the guard may be vibrated upon the bolt 15 as a center in a manner that will be readily understood.

The device described is very simple and inexpensive in construction, may be applied to a machine of any size or construction, and will be found very convenient and safe in use, permitting the operator to handle a greater number of shingles and to perform a greater amount of work owing to the presence of the safety-guard.

Having thus described the invention, what is claimed as new, and desired to be secured by Letters Patent, is—

1. The combination with a knot sawing machine provided with a circular saw and a receiving table located directly above said saw, of a saw guard capable of being swung laterally away from the saw for giving access to the latter and comprising a horizontal portion, a curved downwardly and forwardly extending portion, a pendent vertical flange arranged upon one side of the saw and extending downwardly to the forward end of the guard, the horizontal portion of said guard being provided with a pair of longitudinally elongated slots providing for the longitudinal adjustment of the saw guard as a whole, one of said slots being closed and constituting a pivot slot and the other being T-shaped or provided with a lateral branch opening out at one side of the longitudinal portion, substantially as specified.

2. The herein described saw-guard formed to partially cover a circular saw for the purpose specified and adapted to be swung laterally away from the saw, and extended to form a horizontal bar portion, said bar being provided with a closed longitudinally elongated pivot slot and also with a longitudinally elongated slot having a lateral opening, and fastening devices passing through both slots and securing the guard to the saw table, substantially as and for the purpose described.

In testimony that I claim the foregoing as my own I have hereto affixed my signature in the presence of two witnesses.

LOUIS COME RINGUETTE.

Witnesses:
JOHN LACHAPELLE,
JAMES R. MINAHAN.